Jan. 26, 1954 D. A. POTTER 2,667,094
INSULATION STRIPPING TOOL FOR ELECTRIC CONDUCTORS
Filed April 8, 1950
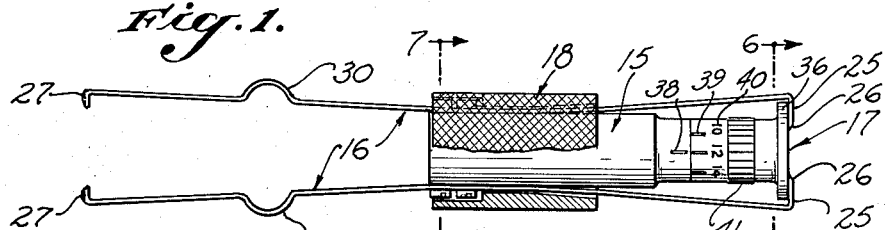
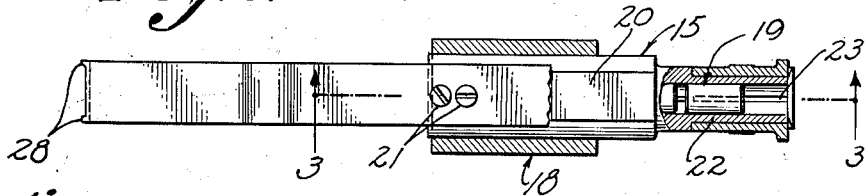
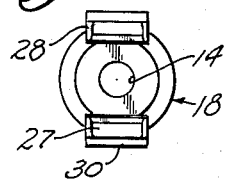
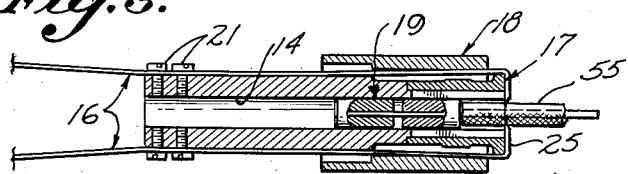
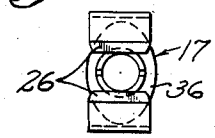
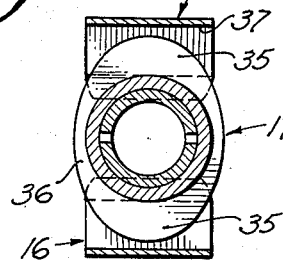
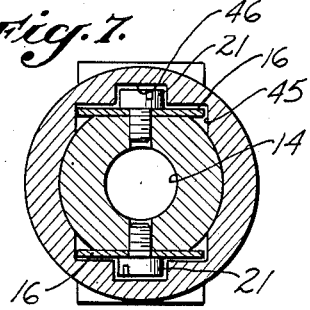
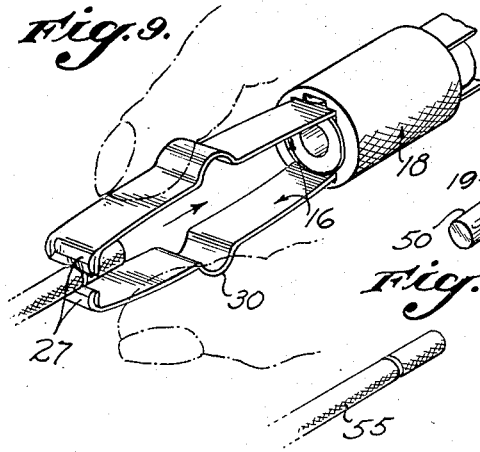
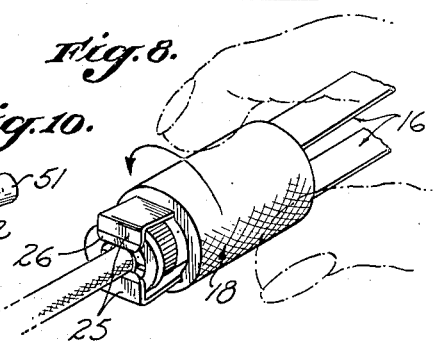
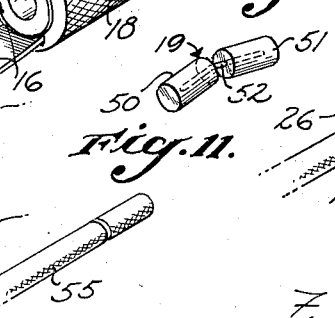
INVENTOR.
DENTON A. POTTER
BY
Fulwider & Mattingly
ATTORNEYS.

Patented Jan. 26, 1954

2,667,094

UNITED STATES PATENT OFFICE 2,667,094

INSULATION STRIPPING TOOL FOR ELECTRIC CONDUCTORS

Denton A. Potter, Santa Monica, Calif.

Application April 8, 1950, Serial No. 154,834

7 Claims. (Cl. 81—9.5)

My invention relates generally to hand tools used by electricians, linemen and the like, and more particularly, to a tool of this class which is used for stripping insulation from electric conductors preparatory to soldering the same, or otherwise securing them to electric appliances, connection plugs, and the like, or to each other.

Devices for the purpose above set forth have been constructed heretofore, but have in the past lacked certain features which I have found are desirable. Among such desirable features in a tool of the class described is that the tool be adjustable for various wire sizes so that the cutting edges which sever the insulation will not damage the electrical conductor.

Another desirable feature is that the insulation be cut cleanly and completely so as to leave no frayed portions which interfere with the securing of the wire conductor.

Bearing in mind the above-stated desiderata, it is a major object of the invention to provide an insulation stripping tool which is readily adjustable to strip insulation from various sizes of electric conductor without damaging such conductor.

It is another object of the invention to provide a tool of the class described in which the lengths of the portion of insulation which is removed may be readily adjusted.

Still another object of the invention is to provide a wire stripper for removing insulation which entirely and cleanly severs the portion of insulation to be removed from that remaining on the wire.

A further object of the invention is to provide a tool of the class described which employs a minimum number of separate parts whereby to simplify and reduce the cost of manufacture.

Yet another object of the invention is to provide a tool of the class described which is small enough to be readily carried in the pocket or in a tool box with other small tools.

The foregoing and additional objects and advantages of the invention will appear from the following detailed description of a hand tool embodying the same, consideration being given likewise to the attached drawings, in which:

Figure 1 is a partially sectioned side elevational view of a wire stripping tool embodying the invention;

Figure 2 is a partially sectioned top plan view of the device shown in Figure 1;

Figure 3 is an elevational section taken on the line 3—3 in Figure 2, showing additionally a length of insulated wire with a terminal portion of the insulation being stripped therefrom;

Figure 4 is an end elevational view of the device shown in Figure 1 as seen from the left end;

Figure 5 is an end elevational view of the device shown in Figure 1 as seen from the right end;

Figure 6 is an enlarged elevational section taken on the line 6—6 in Figure 1;

Figure 7 is an enlarged elevational section taken on the line 7—7 in Figure 1;

Figures 8 and 9 are perspective views showing the successive operations of the tool in removing a terminal portion of insulation;

Figure 10 is an enlarged perspective view of an adjustable end stop member employed in the device shown in Figure 1; and Figure 11 is a fragmentary view of the end of a piece of insulated wire after the insulation has been severed but before the terminal portion of insulation has been removed.

Referring to the drawings, it will be seen that the tool embodying the invention comprises a generally cylindrical body 15, to which are secured two longitudinally extending jaw members 16, a rotatable cam member 17, and a longitudinally slidable sleeve 18. The body 15 is formed with an axial bore 14 therethrough, in which is a movable end stop member 19, which may be selectively positioned at various points in the bore 14, and is held at such adjusted position by its friction with the bore 14, as will hereinafter be described in more detail.

The body 15 is formed with a pair of opposed flats 20 against which the jaw members 16 are secured by means of machine screws 21. The forward end (to the right in Figures 1 through 3) of the body 15 is reduced in diameter to form a bearing member indicated at 22, to receive the cam member 17 rotatably carried on the bearing member 22, which is slotted at 23 in order to effect a resilient gripping action against the internal surface of the cam member 17 whereby to retain the latter in any adjusted rotary position thereof.

The two jaw members 16 are constructed of flat spring steel and stressed so as to normally assume the relatively divergent positions illustrated in Figure 1. The forward ends of the jaw members 16 are bent inwardly, as indicated at 25, and the inner ends of the bent portions 25 are beveled and sharpened to form opposed cutting edges 26. The inturned portions 25 also serve to retain the cam member 17 against longitudinal displacement from the bearing member 22.

The left-hand end of the jaw members 16 are also turned inwardly, as at 27, and the inner edges sharpened somewhat in the same manner as the edges 26. The inturned edges 27 may be employed in pulling off the terminal portion of the insulation of an electrical conductor after such terminal portion has been severed by the use of the cutting edges 26. This operation is illustrated in Figure 9. When the ends 27 are being used to pull off the severed portion of insulation, it is desirable that they be prevented from slipping laterally off of the insulation which they are gripping, and to this end, the two lateral extremities of the gripping edges 27 are coined, as indicated at 28 in Figure 2, so as to provide projections which tend to hold the wire from slipping out laterally from between the opposed edges 27.

Midway between the left-hand ends 27 and the point of connection of the jaws 16 with the body 15, a pair of outwardly projecting convolutions or bulges 30 are formed, one in each of the jaw members 16, thus to provide means by which the jaw members 16 may be securely gripped between the fingers, as shown in Figure 9.

The purpose of the cam member 17, rotatably supported on the forward end of the body 15, is to adjustably limit the inward motion of the resilient jaw members 16, thus to limit the depth to which the cutting edges 26 will penetrate into the insulation of an electric conductor. The operation of the cam member 17 can be seen best in Figure 6 wherein it will be seen that a pair of lobes 35 are formed in a flange portion 36 positioned at the outer end of the cam member 17. The cam lobes 35 form abutments positioned to strike against the undersurface 37 of the jaw members 16 as the latter move inwardly, thus to limit such inward motion. Inasmuch as the lobes 35 are positioned in diametric opposition, the inward motion of each jaw member 16 to its limiting position is the same, thus always positioning the cutting edges 26 symmetrically about the longitudinal axis of the body 15, when the jaw members 16 have been moved in against the cam lobes 35.

It will be seen further that as the cam member 17 is rotated with respect to the body 15, the radial distance from the longitudinal axis of the body 15 to the periphery of the cam will change and thus the separation of the cutting edges 26 will vary in accordance with the rotary position of the cam member 17 on the body 15. The separation of the cutting edges 26 is adjusted to be substantially equal to the diameter of the electrical conductor from which the insulation is to be removed. To facilitate setting the cam member 17 for varying sizes of wire, an index mark 38 is formed on the body 15 as shown in Figure 1, and various scale marks 39, each identified by an indicatory numeral 40, are formed or printed around the shank of the cam member 17. A knurled band 41 is also formed in the cam member 17 to assist in rotating the same.

The sleeve 18 is a relatively loose sliding fit on the body 15, and has formed in the bore thereof a pair of opposed internal keyways 45 to clear the jaw members 16. Additionally, relieved portions 46 are formed in the interior surface of the sleeve 18 in order to clear the heads of the attachment screws 21, as shown in Figure 7. The relieved portions or recesses 46 extend only partway through the length of the sleeve 18, thus to form stops limiting the rearward longitudinal movement of the sleeve 18 on the body 15 and the jaw members 16 secured thereto. As can be seen best in Figure 3, the movement of the sleeve 18 toward the front end of the body 15 forces the cutting edges toward each other until such movement is limited by the jaw members 16 striking against the cam lobes 35. Such inward movement of the cutting edges 26 forces the same into the insulation 55 of a conductor which has been introduced into the bore 14 of the body 15. Due to the wedging action of the sleeve 18 against the resilient jaw members 16, the sleeve remains in its forward position without manual effort, thus leaving the operator's hands free for further manipulation of the tool.

The entire tool may then be rotated about the longitudinal axis thereof, as indicated in Figure 8, extending the cut through the insulation entirely around the periphery thereof, and completely severing the terminal portion of the insulation from the remainder thereof. After the insulation has been severed as just stated, the tool may then be released and reversed, and the rearward end 27 of the jaw member 16 employed to pull off the severed portion, as shown in Figure 9.

It is desirable, of course, that the tool be adjustable to cut various lengths of insulation from the end of an electrical conductor, depending on the type of connection that is to be made. To provide for such adjustment, the movable stop 19 is slidable to various positions in the bore 14. Such adjustment is made by inserting a small rod, such as a nail or relatively heavy piece of wire, into the bore 14 and pushing the stop member 19 to its desired position. In order that the stop member 19 will be firmly held in any adjusted position thereof, it is made in two sections 50 and 51 joined together by a central spring member 52. The spring member 52 is a length of steel piano wire or other highly resilient material and is slightly bent so as to throw the two cylindrical sections 50 and 51 out of alignment. This arrangement is illustrated in Figure 10, the amount of bending being exaggerated somewhat for purposes of illustration. The cylindrical sections 50 and 51 are a fairly close fit in the bore 14 and thus the misalignment effected by the spring member 52 causes the member 19 to bind against the bore 14 and thus remain in any position to which it has been adjusted.

Summarizing the steps of operating the herein described tool, they are as follows. First the cam member 17 is adjusted to the desired wire size by rotating the same until the appropriate scale mark 39, as shown by an indicatory numeral 40, aligns with the index 38. The stop member 19 is then pushed to a position in the bore 14 where its distance from the forward end of the body 15 is such as to provide the appropriate length of removed insulation. The insulated conductor 55 is then inserted into the bore 14 at the forward end of the body 15 until it stops against the stop member 19 and the sleeve 18 is then pushed forwardly forcing the cutting edges 26 into the insulation. Thereafter (the sleeve 18 remaining in such forward position), the entire tool is rotated, as shown in Figure 8, completely severing the insulation, whereupon the sleeve 18 is withdrawn to its original position as shown in Figure 1, releasing the cutting edges 26 and permitting removal of the conductor 55 in the condition shown in Figure 11. Thereafter, the severed portion of the insulation is removed in the manner shown in Figure 9.

While the device shown and described herein is fully capable of achieving the objects and providing the advantages hereinbefore stated, it will be realized that it is capable of some modification without departure from the spirit of the invention. For this reason, I do not mean to be limited to the form shown and described, but rather to the scope of the appended claims.

I claim:

1. A tool for removing insulation from electric conductors, comprising in combination: an elongate body having an axial bore and a concentric cylindrical portion of reduced diameter adjacent the forward end thereof, said reduced diameter portion being longitudinally slotted to permit resiliently yielding contraction thereof; a tubular member carried on said reduced diameter portion, said tubular member having a relatively close fit on said reduced diameter portion for frictionally resisted rotation thereon, said tubular member having an ovoid flange on the forward end thereof disposed to form a pair of diametrically opposed symmetrical cam lobes on said tubular member; a pair of flat, resilient jaws secured against opposite sides of said body and extending longitudinally beyond the forward end of said body, said jaws having the forward ends thereof bent inwardly and sharpened to form opposed, transversely oriented cutting edges symmetrically disposed about the axis of said body and said jaws being stressed to normally diverge slightly to space said cutting edges; a sleeve slidably carried on said body and relatively closely embracing said jaws whereby forward movement of said sleeve forces said jaws together against said cam lobes to press said cutting edges to a predetermined depth into insulation of an electric conductor partially inserted into said bore; and a stop member in said bore frictionally engaged with the wall thereof, said stop member being slidable longitudinally in said bore to adjustably limit the length of conductor inserted into said bore.

2. A tool for removing insulation from electric conductors, comprising in combination: an elongate body having a bearing member on the forward end thereof; a bored member mounted for rotation on said bearing member, said bored member having an ovoid flange on the forward end thereof disposed to form a pair of diametrically opposed symmetrical cam lobes on said bored member; a pair of flat, resilient jaws secured against opposite sides of said body and extending longitudinally beyond the forward end of said body, said jaws having the forward ends thereof bent inwardly and sharpened to form opposed, transversely oriented cutting edges symmetrically disposed about the axis of said bearing member and said jaws being stressed to normally diverge slightly to space said cutting edges; and a sleeve slidably carried on said body and relatively closely embracing said jaws whereby forward movement of said sleeve forces said jaws together against said cam lobes to press said cutting edges to a predetermined depth into insulation of an electric conductor partially inserted between said edges.

3. A tool for removing insulation from electric conductors, comprising in combination: an elongate body having an axial bore and a concentric cylindrical portion of reduced diameter adjacent the forward end thereof, said reduced diameter portion being longitudinally slotted to permit resiliently yielding contraction thereof; a tubular member carried on said reduced diameter portion, said tubular member having a relatively close fit on said reduced diameter portion for frictionally resisted rotation thereon, said tubular member having an ovoid flange on the forward end thereof disposed to form a pair of diametrically opposed symmetrical cam lobes on said tubular member; a pair of flat, resilient jaws secured against opposite sides of said body and extending longitudinally beyond the forward end of said body, said jaws having the forward ends thereof bent inwardly and sharpened to form opposed, transversely oriented cutting edges symmetrically disposed about the axis of said body and said jaws being stressed to normally diverge slightly to space said cutting edges; and a sleeve slidably carried on said body and relatively closely embracing said jaws whereby forward movement of said sleeve forces said jaws together against said cam lobes to press said cutting edges to a predetermined depth into insulation of an electric conductor partially inserted into said bore.

4. In a cutting tool of the class described: a cylindrical body having an axial bore and a bearing member formed on a forward portion thereof, the axis of said bearing member lying in the axial plane of said body; a member rotatably carried on said bearing member adjacent a forward end of said body and having a pair of symmetrically disposed, outwardly projecting cam lobes formed thereon; a pair of slightly divergent flat spring jaws secured to opposite sides of said body and having free forward ends disposed on opposite sides of the mouth of said bore, said forward ends being bent inwardly and sharpened to form opposed cutting edges; a sleeve embracing said jaws for forward sliding movement thereon to force the same toward each other against said cam lobes; and a stop member adjustably carried in said bore to limit the depth thereof.

5. In a cutting tool of the class described: a cylindrical body with a bearing member formed on a forward end thereof; a member rotatably carried on said bearing member and having a pair of symmetrically disposed, outwardly projecting cam lobes formed thereon; a pair of slightly divergent flat spring jaws secured to opposite sides of said body and having free forward ends disposed on opposite sides of the axis of said bearing member, said forward ends being bent inwardly and sharpened to form opposed cutting edges; and a sleeve embracing said jaws for forward sliding movement thereon to force the same toward each other against said cam lobes.

6. In a cutting tool of the class described: a body having a bore therein; a two-lobe cam mounted on said body for rotation about the axis of said bore; a pair of movable jaws secured to said body, extending on opposite sides of said cam, and having cutting edges formed therein and disposed on opposite sides of a mouth of said bore; a member engaged with said jaws to move the same together against said cam; and stop means in said body to adjust the depth of said bore.

7. In a cutting tool of the class described: a pair of jaws secured together at an end juncture, having free extending ends movable toward each other, and having opposed cutting edges on said free ends; a bearing member secured to said jaws and having its axis lying in a plane substantially midway between said jaws; and a symmetrical two-lobe cam mounted for rotation on said bearing member to limit movement of said jaws toward each other and adjust the closest spacing of said cutting edges, said bearing member having a bore formed therein to support an insulated electric conductor between said cutting edges, said supporting bore being positioned to permit relative rotation of said cutting edges with respect to said conductor about the longitudinal axis of said conductor.

DENTON A. POTTER.

References Cited in the file of this patent

UNITED STATES PATENTS

| Number | Name | Date |
|---|---|---|
| 442,142 | Schwerter | Dec. 9, 1890 |
| 1,566,297 | Williams | Dec. 22, 1925 |
| 1,784,298 | Mahon et al. | Dec. 9, 1930 |
| 2,451,463 | Zimmerman | Oct. 19, 1948 |